R. A. HEMINGWAY.
SCALE.
APPLICATION FILED JULY 13, 1920.
1,402,606.
Patented Jan. 3, 1922.
3 SHEETS—SHEET 1.
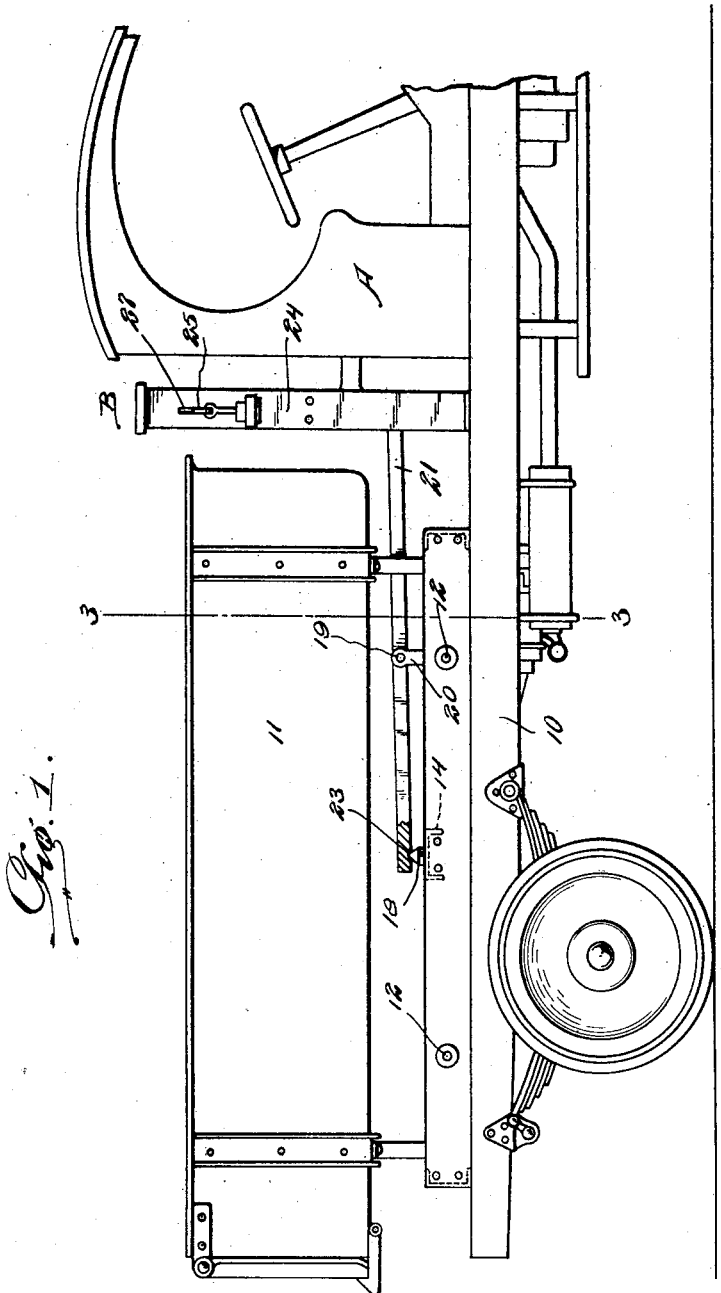
R. A. Hemingway,
INVENTOR
BY Victor J. Evans.
ATTORNEY

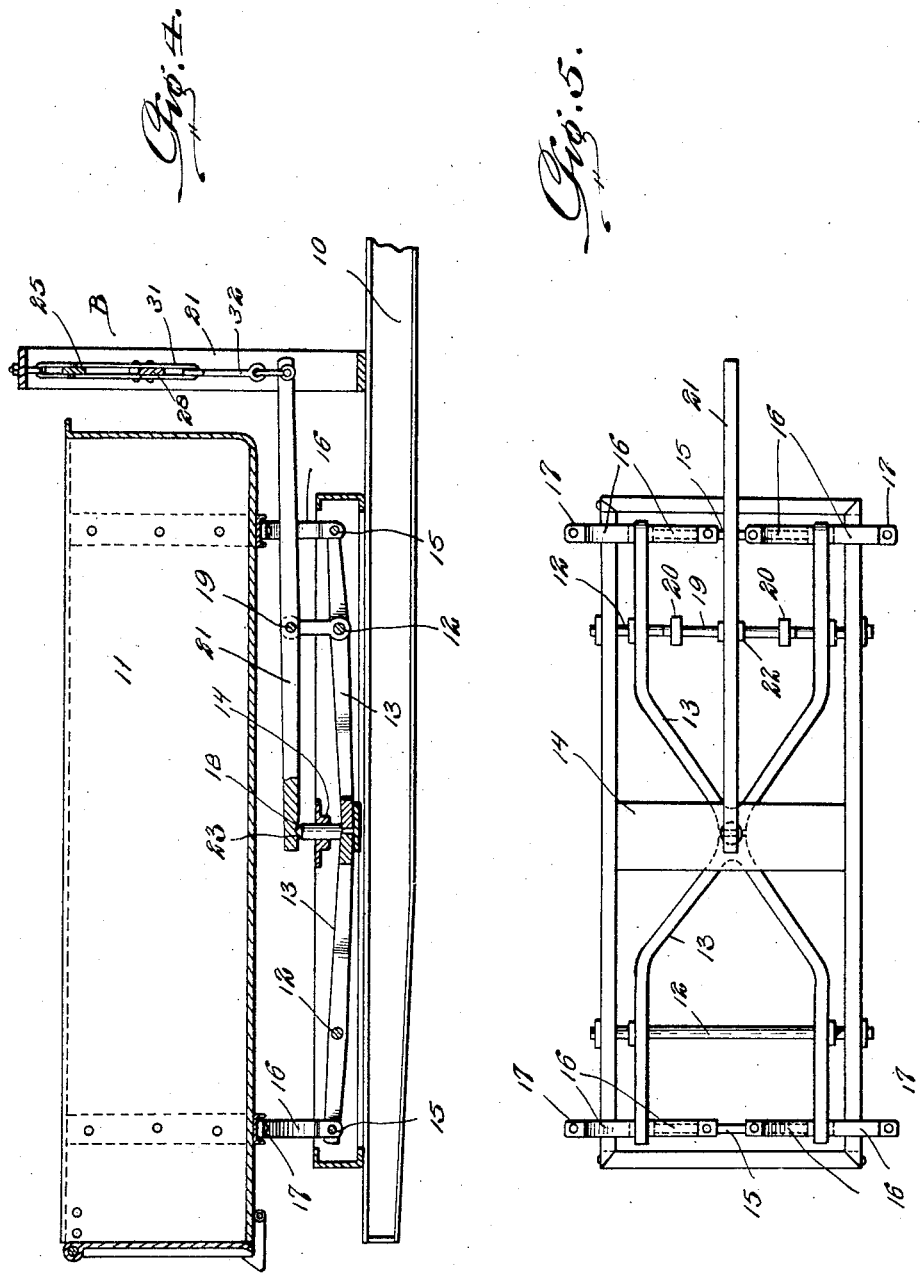

UNITED STATES PATENT OFFICE.

RICHARD A. HEMINGWAY, OF MEMPHIS, TENNESSEE.

SCALE.

1,402,606.  Specification of Letters Patent.  Patented Jan. 3, 1922.

Application filed July 13, 1920. Serial No. 395,861.

*To all whom it may concern:*

Be it known that I, RICHARD A. HEMINGWAY, a citizen of the United States, residing at Memphis, in the county of Shelby and State of Tennessee, have invented new and useful Improvements in Scales, of which the following is a specification.

This invention relates to delivery wagons, and comprehends the provision of a scale therefor so that the weight of the contents of the wagon may be readily determined at the outset of a trip, or at any time during the trip after certain portions of the load has been delivered or removed from the wagon body.

Most specifically stated, the invention provides a scale arranged at one end of the wagon frame, and mechanism interposed between the frame and wagon body, the mechanism being actuated by the weight of the load to operate the scale for the purpose above mentioned.

The nature and advantages of the invention will be better understood when the following detailed description is taken in connection with the accompanying drawings, the invention residing in the construction, combination and arrangement of parts as claimed.

In the drawings forming part of this application, like numerals of reference indicate similar parts in the several views and wherein:

Figure 1 is a side elevation of the wagon equipped with the invention.

Figure 2 is an end elevation.

Figure 4 is a longitudinal section.

Figure 5 is a plan view with the body of the wagon removed.

Figure 3:
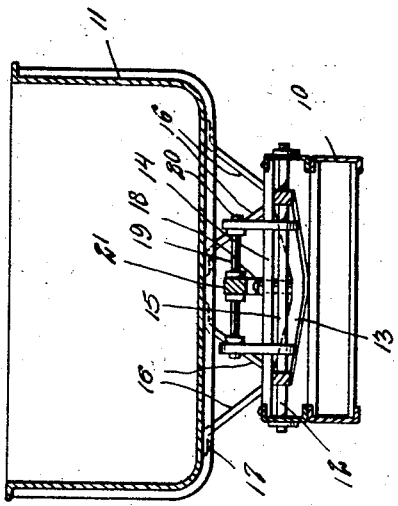
Figure 3 is a transverse section taken on line 3—3 of Figure 1.
Figure 6:
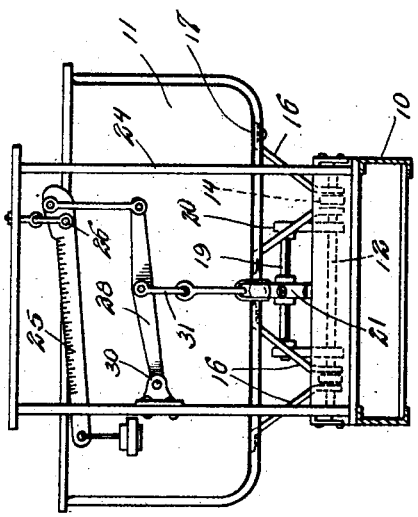

Referring to the drawings in detail, A indicates generally a wagon of usual construction, wherein the frame is indicated at 10 and the wagon body at 11. Connecting the parallel sides of the frame 10, at points adjacent the opposite ends thereof, are transverse rods 12, and each of which pivotally supports a yoke 13 adapted for rocking movement. These yokes are identical in construction, and have their adjacent extremities terminating beneath the transverse member 14 which connects the parallel sides of the frame 10. The outermost end of each yoke supports a transverse rod 15 upon which is mounted bracket arms 16 for supporting the wagon body 11. These arms converge toward the center of the frame 10 as clearly shown and have their upper extremities offset as at 17. Any suitable fastening means may be utilized in securing the wagon body 11 upon the offset extremities 17 of the bracket arms. The transverse member 14 is provided with a central opening for the reception of a pointed plunger 18, the pointed extremity of the plunger projecting above the member 14, while the opposite end of the plunger rests upon the adjacent ends of the yokes 13. A transverse rod 19 connects the opposed sides of the frame 10 between the transverse member 14 and the adjacent rod 12, and carried by the rod 19 are parallel standards 20. A lever 21 is fulcrumed at a point midway between its ends upon a pivot 22 which connects the parallel standards 20. The lever may be constructed from any suitable material, and on the underside adjacent one end thereof the lever is provided with a recess 23 for the reception of the pointed extremity of the plunger 18. The opposite end of this lever projects an appreciable distance beyond the forward end of the frame 10 and is connected with the scale indicated generally at B.

The scale includes a substantially rectangular frame 24 which is suitable secured upon the frame 10 of the wagon at the forward end thereof in any suitable manner. The scale beam 25 is fulcrumed at 26, the free end of this beam operating within an elongated slot 27 in one side of the frame B. The lever 28 of the scale is suspended from the beam 25 adjacent one end thereof by means of a yoke 29, while the opposite end of this lever is pivoted upon a bracket 30 secured to the same side of the frame B through which the beam 25 projects. The lever 25 is equipped with a yoke 31 at a point approximately midway between the ends thereof, the yoke 31 being connected to the adjacent end of an eye bolt 32 associated with the adjacent end of the lever 31.

In practice, the weight of the load is equally distributed upon the yokes 13, which are mounted for rocking movement, and which when rocked elevate the plunger 18, and operate the mechanism to actuate the scale B. For instance, when the outer ends of the yokes 13 are depressed under the weight of the load, the adjacent extremities of the yokes are elevated and thus move the plunger 18 upwardly. The plunger imparts a rocking movement to the lever 21 so that one end of this lever exerts a downward pull upon the scale beam 25 of the lever 29. In this manner, the particular weight of the load may be readily and easily determined.

The invention is particularly advantageous for use with coal trucks or the like wherein a number of deliveries are made on a single trip. For instance, should four or five tons of coal be placed in the wagon body 11 for delivery, to four or five different customers, at the outset of the trip the scale would indicate the total weight of the load. When the weight is diminished by the delivery of the first ton of coal, the scale B indicates to the driver or operator when one ton has been removed from the body 11. The invention is not only simple in construction, but it is strong and durable, and positive of operation for the purpose intended.

While it is believed that from the foregoing description the nature and advantages of the invention will be readily apparent, I desire to have it understood that I do not limit myself to the details herein shown and described, and that such changes may be resorted to when desired as fall within the scope of what is claimed.

What I claim is:—

1. The combination with a vehicle, of a scale mounted upon the frame thereof, a lever fulcrumed upon said frame beneath the vehicle body, yokes pivoted upon said frame and having their adjacent ends closely associated, said yokes supporting the vehicle body, and adapted to be rocked under the weight of the latter, a connection between the yokes and one end of the lever, whereby the latter is moved upon its fulcrum and on movement of said yoke, and a connection between the opposite end of the lever and the scale to indicate the weight of the load.

2. The combination with a vehicle, of a scale mounted upon the frame thereof, a lever fulcrumed upon the frame beneath the vehicle body, yokes pivoted upon said frame and having their adjacent ends closely associated, a plunger reposing upon the adjacent ends of said yokes, and disposed beneath the adjacent end of said lever, said yokes supporting the vehicle body and a connection between the opposite end of said lever and the scale for the purpose specified.

3. The combination with a vehicle, of a scale mounted upon the frame thereof, a lever fulcrumed upon the frame beneath the vehicle body, yokes pivoted upon the frame and having their adjacent ends closely associated, a transversely disposed member arranged above the adjacent ends of said yokes, a plunger slidable through said member and reposing upon the said adjacent ends of said yokes, the upper end of said plunger engaging the underside of the lever, brackets carried by the yokes and supporting the vehicle body and a connection between the opposite end of said lever and the scale for the purpose specified.

In testimony whereof I affix my signature.

RICHARD A. HEMINGWAY.